(12) United States Patent
Britt et al.

(10) Patent No.: US 6,430,617 B1
(45) Date of Patent: Aug. 6, 2002

(54) METHODS AND SYSTEMS FOR DYNAMIC MEASUREMENT OF A SYSTEM'S ABILITY TO SUPPORT DATA COLLECTION BY NETWORK MANAGEMENT SYSTEM APPLICATIONS

(75) Inventors: Steve Van Britt, Roseville; Linda Ann Klinger, Citrus Heights, both of CA (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/273,412

(22) Filed: Mar. 22, 1999

(51) Int. Cl.[7] .............................................. G06F 13/00
(52) U.S. Cl. ...................................................... 709/224
(58) Field of Search ........................... 379/225; 370/468, 370/230, 235; 709/235, 229; 79/224

(56) References Cited

U.S. PATENT DOCUMENTS 6,011,804 A  *  1/2000  Bertin et al. ................. 370/468
6,222,856 B1 *  4/2001  Krishnan et al. ............ 370/468

* cited by examiner

Primary Examiner—Robert B. Harrell (57) ABSTRACT

Methods and associated systems for dynamically measuring the capacity of a host system to gather network management data by a network management system application. The methods of the present invention are operable as part of a network management system on host systems of the network management applications. An NMS application is provided a list of other nodes on the network with which it will likely exchange data to perform desired network management functions. The NMS application then directs a steady stream of data units to the identified nodes which, in turn, echo the received data units back to the originating host system. The data units are sequentially identified with, at least, a sequence number. The NMS application then examines the data unit received back from the nodes. If no packets are missing as indicated by the sequence numbers, then the frequency of data unit generation and transmission is increased to identify a saturation point at which returned data units are lost by the NMS application's host system. Reaching this saturation point is indicative of over subscription of at least one computing resource required by the network management application on the host computer. This dynamically measured value is then used to optimize the performance of the NMS application by governing its exchange of other data units for purposes of network management.

24 Claims, 4 Drawing Sheets

METHODS AND SYSTEMS FOR DYNAMIC MEASUREMENT OF A SYSTEM'S ABILITY TO SUPPORT DATA COLLECTION BY NETWORK MANAGEMENT SYSTEM APPLICATIONS

BACKGROUND OF THE INVENTION

1. Field of the Invention

The present invention relates to network management systems and in particular relates to methods and associated systems that dynamically measure the ability of a computer system to support data collection for analysis by network management system applications.

2. Discussion of Related Art

It is common for computer systems to be linked via communication media for exchange of information and to distribute computational tasks among a plurality of such interconnected computer systems. Such collections of interconnected computer systems and/or the communication paths that interconnect them are often referred to as networks. Computing tasks may be distributed over the network of computer systems by application of distributed computing techniques known in the art. Data and computing resources such as storage devices, printers, and other devices may be shared over such networks so that a user at any of the computing systems of the network perceives that he/she is locally attached to the shared resources and data.

Use of networks has grown rapidly as computing applications have evolved. The Internet is an example of a network that has grown to worldwide proportions with millions of users and their computer systems interconnected at any given moment. Other networks are contained within a single organization—an enterprise. For example, a single corporation may use a network to connect all elements of their business. Such an enterprise-wide network would connect all systems in a building and may extend to other buildings and other remote sites even around the world. Though the Internet is not centrally managed by a single entity, enterprise computing environments are typically managed by a single central entity—a network manager—or at most a relatively small group of network managers cooperating to manage the computing resources of the enterprise through the network.

Small networks (i.e., a few computing systems connected within the same office area) are easily managed by a network manager by physically visiting each computing system to monitor performance, diagnose problems, configure systems, etc. However, large networks (i.e., a large number of computing systems physically dispersed with respect to one another) present logistical problems for network managers. It is difficult or impossible to manage such networks where physical presence of a network manager is required at each computing system of the enterprise.

Network managers in such large computing enterprises often use special purpose computer programs to monitor operation and performance of the enterprise network. Such programs are often referred to as network management systems (or NMS).

An NMS is a combination of hardware and software used to administer various aspects of network operation by controlling the configuration of equipment used in the network's infrastructure. Most NMSs are operable on a computing system (node) of the network to gather data regarding performance of the network and/or to diagnose operation of the network. Such NMSs are generally a collection of one or more computer application programs that exchange messages with other computing systems and communication devices (nodes) on the enterprise network to achieve the desired data acquisition and diagnostics. In all but the most trivial networks an NMS also performs critical data consolidation and filtering functions that allow the network manager to focus on the information of the greatest importance to him: data that reveals existing or pending problems with the network's performance.

Because an NMS is critical to the operation of most networks many NMSs consist of one or more software packages that execute on dedicated host computer systems, or workstations. In smaller networks an NMS may consist of software executing on a workstation that is also used for other business application purposes. Due to the heavier load of managing larger networks, NMSs on larger networks tend to run on one or more workstations dedicated to the NMS operations.

NMSs usually include component applications that execute periodically or even continuously to monitor various aspects of network performance over time. Such NMS applications might do things like periodically check to ensure that all portions of the network are operable or collect network data that reveals which nodes utilize the network most heavily. If the data collected by these NMS applications is to accurately reflect the state of the network over time, each NMS application must be able to execute its functions completely and without restriction.

Yet such NMS applications compete with one another, other network management software, and even completely unrelated software programs for the limited resources of the host computer system on which they execute.

Every workstation's physical memory and processing capacity are limited and therefore valuable resources. Further, the workstation's operating system restricts other resources needed to collect network management data such as virtual memory (secondary storage capacity used to extend the effective size of main memory), file descriptors (data structures/objects used by application programs to manipulate files stored on persistent storage of the computing system), and network input/output (the system's capacity to handle network traffic).

Generally speaking, assuming a given NMS package, the amount of each resource needed to effectively monitor a network increases roughly in proportion with the size of the network. The inevitable outcome faced by a network manager with a growing network is that the network outstrips the monitoring capabilities of their NMS as operable on a particular computing system. This problem is increasingly common as networks evolve from simple topologies (i.e., a single shared communication path such as a single Ethernet segment) to more complex ones such as micro-segmented (desktop-switched) topologies.

In such a situation the network manager must invest more money to maintain an NMS that provides adequate control of the network. One option is to purchase a new NMS package that can better handle large topologies; this can require the network manager to conduct a time-consuming survey and evaluation of available products, expend several thousand dollars, and endure a steep learning curve to realize the benefits of the new software. Another option is for the network manager to keep their current network management software and simply upgrade the workstation on which the software executes; this may be less expensive than buying new software but is generally a stopgap solution. Eventually, the enterprise network will grow to a point where the NMS capability will require more resources than presently available.

Some present NMS applications utilize configuration parameters and models of the systems on which they run to limit their demands for resources. Some NMS applications, for example, inspect certain statically configured aspects of their host system and adjust their behavior accordingly. These inspections usually involve some combination of system parameters such as the type and configuration of network media and protocols, the type and speed of network interface adapters, the central processor type and speed, and the system memory. Often these parameters are inspected upon installation or initial configuration of the NMS application or perhaps inspected once when the NMS application is first started. However, it is impractical and imprecise to inspect all of the applicable settings on a host at a given time in order to project the system resources that will be available to an individual network management application during its subsequent execution. Even if all of the statically configured aspects of the system that affect NMS application performance were examined and their cumulative effect accounted for, it is impossible to predict the impact that other applications executing on the same host will have on the network management application's interaction with the system.

In view of the above discussion, it is clear that a need exists for improved methods and associated systems for adapting an NMS to the computing environment in which it is operable.

SUMMARY OF THE INVENTION

The present invention solves the above and other problems, thereby advancing the state of the useful arts, by providing methods and associated systems for dynamically measuring parameters of the computing environment in which it is operating to determine the computing resources available at any desired time. More specifically, the present invention periodically gathers data regarding the computing system on which it operates and dynamically adapts its functioning to the presently available computing resources.

More specifically, the present invention enables NMS applications to offer a third option to network managers in this situation, an option in which the existing NMS adjusts its behavior to continue collecting data from the network as the network grows, and hence the resource requirements of the NMS on its host system grows. The invention allows NMS component applications to determine the maximum rate at which they can transmit and receive network traffic on a given host computer system (the system on which the NMS application is operating). This rate will be limited to some maximum value that is reached when such an NMS application consumes all of one or more system resources that affect its operation. The nature and number of resources exhausted by the NMS application are unimportant; the key is that one or more resources become over subscribed (over utilized) and the performance of the NMS application is bounded as a result. Once the maximum rate of information exchange has been established an NMS application can use the rate so determined for a number of purposes. A most important use is to optimize and adapt its behavior for the particular environment of its NMS.

Still more specifically, this invention dynamically determines a level of performance of the NMS application which over utilizes some resource of its host system. Determining this threshold level is accomplished by the exchange of traffic protocol data units (PDUs) with other nodes in the network. The other nodes in the network involved in this determination must support the exchange of the PDUs. The NMS application is supplied with a list of the nodes from which network management data could potentially be collected; this list should preferably contain multiple nodes. The nodes identified must be capable of responding to directed request protocol data units (PDUs) from the NMS component application, either with a corresponding single directed response or a stream of directed PDUs as appropriate.

Each PDU includes, at a minimum, a sequence number identifying sequential instances of the PDU. In accordance with the invention, the NMS application generates a stream of such PDUs to all nodes from which management data may be collected. Each PDU in the stream is identified by, at least, a sequence number. The nodes essentially echo the PDU so received back to the generating host system of the NMS application. The NMS application therefore receives the echoed PDU responses from all nodes to which the PDUs were directed. If the system resources of the NMS application's host system are not over subscribed, all PDUs will be received in proper sequence by the NMS application as determined by the sequence numbers in each PDU. In order to gauge its maximum rate of traffic exchange with other nodes of the network, referred to herein as the PDU saturation point, the NMS application initiates a test that consists of a simultaneous exchange of traffic with as many nodes from its list as possible. The purpose of this test is to generate a relatively steady PDU flow between the NMS application and other nodes so that the NMS application's capacity to process network traffic is exceeded. The frequency of the steady flow is increased until this capacity is exceeded. The NMS application will view this information flow as an aggregated number of inbound and outbound PDUs that eventually reaches the PDU saturation point, which will be computed as an average number of PDUs processed per unit time during the test period.

As mentioned previously, though many present NMS applications exist in today's market, none empirically measure the capabilities of the host computer system that they execute on for any purpose. Embedding such an algorithm into NMS packages provides NMS applications with information that they can use in a variety of ways. The resulting measure will reduce the limitations placed on the network management software by all of the host's various static attributes (such as memory and disk configuration, CPU capability, and networking stack) and the system's dynamic attributes (primarily the amount of each physical resource available to the network management software given the other applications running on the host) to a single dynamically ascertained number that represents the most important metric of all to most network-focused software modules: the maximum rate at which PDUs may be exchanged between the NMS application and nodes on the network.

The most obvious and direct application of the maximum rate at which a NMS package may exchange PDUs with other nodes in the network is to optimize the NMS software's performance given the resources that are available to it on a particular host system by governing the number of PDUs exchanged by the NMS application and other nodes. This dynamic method of tailoring software behavior to produce a specific level of resource consumption for a given host system contrasts sharply with the approach employed by prior NMS applications. Most current NMS applications are incognizant of whether they are running on a dedicated workstation or one shared with other enterprise applications. They therefore attempt to execute their algorithms using the "brute force" method without regard to the capabilities of the host system or the impact that their actions may have on the other applications that share the host. Those NMS applications that do inspect certain statically configured aspects of their host system and adjust their behavior accordingly all suffer from the same shortcoming: it is impractical and imprecise to inspect all of the applicable settings on a host in order to project the system resources that will be available to an individual NMS application during its subsequent execution. By contrast, the present invention provides a measure that all NMS applications could use to behave as "good citizen" applications on every host where they execute, by using only those system resources that are not required by other applications residing on the same host.

In a first aspect of the invention, the invention provides for a method for adapting operation of a network management system application to the host system capacity on which it operates by determining a protocol data unit exchange saturation point of the host system and adapting operation of the NMS application so as to not exchange protocol data units with other nodes of a network in excess of the determined saturation point. The saturation point is determined by periodically exchanging protocol data units with all of other nodes substantially simultaneously. The saturation point is then determined by detecting loss of protocol data units returned to the host system from at least one of the other nodes. The frequency of the exchange is used to determine the saturation point. The method therefore periodically increases the frequency of the protocol data unit exchange until a loss of returned data is detected.

Another aspect of the present invention provides for an adaptable network management application system operable on a host system of a network which includes a protocol data unit exchange monitor that detects a saturation point in protocol data unit exchange between the NMS application and other nodes of the network and an operation adapter that adapts NMS application so as to not exchange protocol data units with other nodes of the network in excess of the saturation point. The system includes a transceiver element to exchange protocol data units with all other nodes substantially simultaneously and a protocol data unit loss detector to detect loss of protocol data units returned to the host system from at least one other node. The loss detector then determines the saturation point from the frequency of the periodic exchange. The monitor increases the frequency of the periodic exchange until loss of protocol data units is detected.

The above, and other features, aspects and advantages of the present invention will become apparent from the following descriptions and attached drawings.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
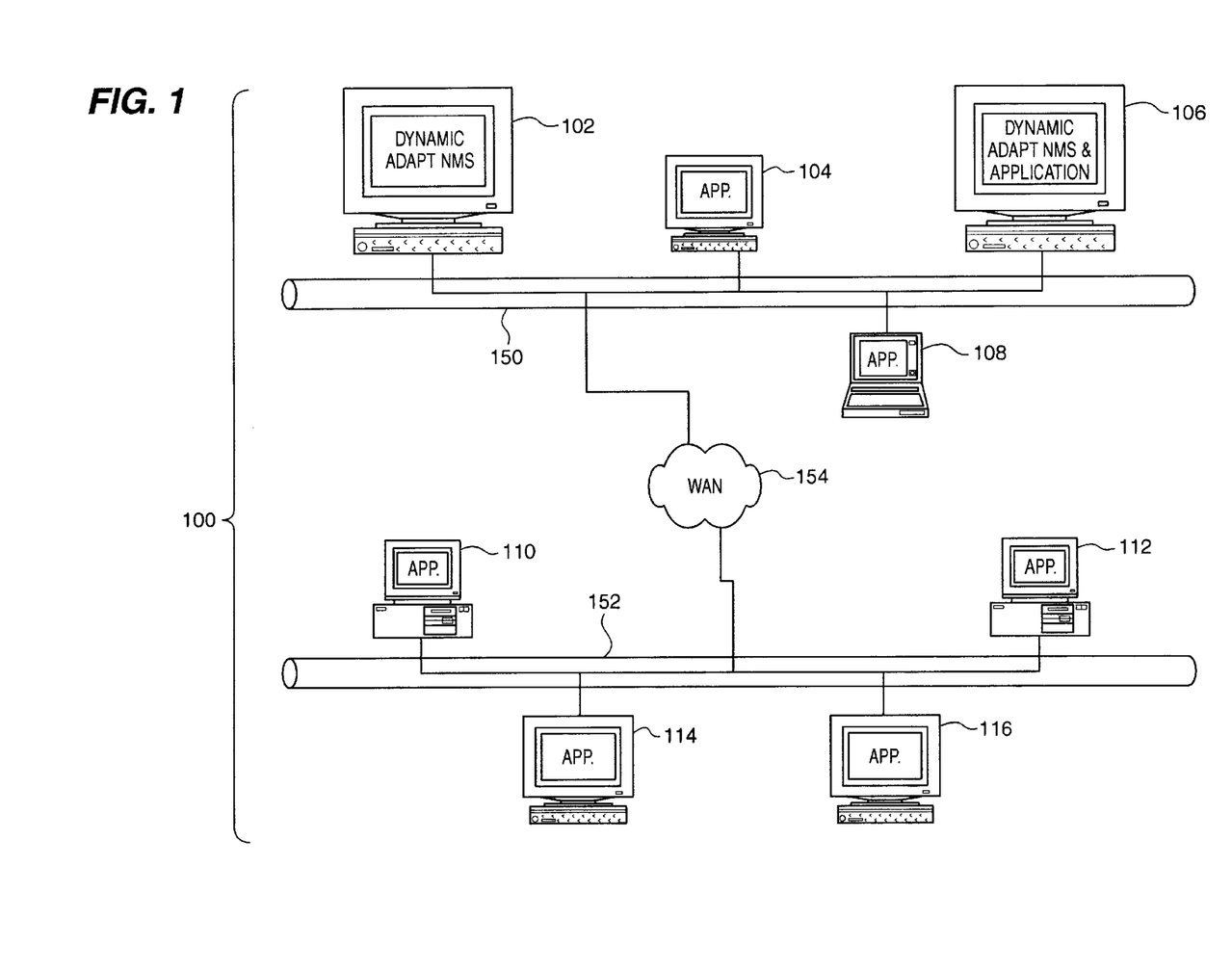
FIG. 1 is a block diagram of an enterprise network in which the methods and structures of the present invention are advantageously applied.

FIG. 1 is a block diagram of an exemplary enterprise network environment 100 in which the methods and structures of the present invention are advantageously applied. A plurality of host systems 102 through 116 are interconnected via networking segments 150 and 152. Networking segments 150 and 152 are, in turn, interconnected via wide area network 154. Those skilled in the art will readily recognize that the networking topology of FIG. 1 is intended merely as exemplary of a wide variety of networking topologies in which network management systems (NMS) are utilized. For example, simpler topologies in which all the computing systems (nodes) are interconnected via a single networking segment may advantageously apply the techniques and structure of the present invention. In like manner, more complex topologies utilizing a plurality of wide area networks interconnecting in a large number of networking segments where each segment may be itself subdivided into sub-segments, etc. may also advantageously apply the techniques and structures of the present invention.

As shown in the exemplary network enterprise environment 100 of FIG. 1, nodes 104 and 108 through 116 are operable to perform particular dedicated application programs useful in the enterprise. Nodes 102 and 106 include network management system (NMS) functions which dynamically adapt their operation to the particular computing environment of their respective host systems. As shown in FIG. 1, node 102 is dedicated to the network management systems functions (NMS applications) operable thereon. By contrast, node 106 includes network management system functions operable thereon in accordance with the present invention and co-operable on the computing node 106 with other enterprise applications.

The NMS applications gather data from other nodes of the network to provide the requested management functions. For example, a network manager at node 102 may request information regarding status of applications operable on node 114. Such information is gathered by the exchange of data units specific to network management protocols. Cooperating processes on each of node 102 and 114, for example, permit the network manager at node 102 to gather, analyze and display such network data. Such protocol data units are often referred to as packets. However, use of the term "packet" may cause the reader to improperly limit the application of the present invention to communication media and protocols that are "packet oriented." Though perhaps more cumbersome, the term "protocol data units" (PDU) will be used herein to refer to the exchanged traffic between an NMS application and other nodes of the enterprise network.

The consumption of host system resources by an NMS application that collects data from the network is usually proportional to the rate at which the NMS application exchanges traffic (PDUs) with nodes on the network. Many of the actions taken by such an NMS application either generate outbound traffic or are initiated by inbound traffic. Consequently, most of the system resources consumed by such an NMS application are directly related to the exchange of traffic with other nodes.

Suppose that a maximum rate can be established for the exchange of traffic between an NMS application and nodes on the network. It may be assumed that this rate is limited by the capabilities of the NMS, the NMS application itself, or the nodes that the NMS application exchanges PDUs with. Suppose further that the exchange is structured so that the nodes contacted by the NMS application are unlikely to limit their flow of PDUs to and from the NMS application. The nodes may then be ignored as a potential limiting factor on the rate of traffic exchanged, leaving the NMS and the NMS application itself as possible limiting factors.

Many NMS applications are driven by user interaction. The user will often initiate the retrieval, analysis, and presentation of data from one or more nodes on the network. In such cases the rate of traffic exchanged with nodes on the network is controlled by the frequency with which the user demands data. It is also common for a user to initiate periodic data retrievals from one or more nodes in order to graph activity in a device or a portion of the network. Network management component applications that implement this type of data retrieval, or even continual collection of data from network nodes, are designed to retrieve data as quickly as possible. Such NMS applications are optimized so that execution of their code doesn't limit the rate at which traffic is exchanged with the network. Rather, the interaction of the NMS application with the NMS will impose a maximum rate at which traffic is exchanged with the network. Many factors may dictate at what point this limit is reached: the amount of available CPU time, the amount of available virtual memory, and the ability of the network stack(s) to process inbound and outbound traffic.

This invention can be applied to network management applications that collect data from other nodes on the network. The NMS application must be supplied with a list of the nodes that data could potentially be collected from; this list should preferably contain multiple nodes, and should reflect the content of the network to be managed by the NMS application as completely as possible. The NMS application may choose not to apply this algorithm to the network if it determines that an insufficient number of nodes are available to meet its requirements; this number will be specific to each particular NMS application. The data collected may be of any type and the collection may occur with any frequency. The nodes identified must be capable of responding to directed request protocol data units (PDUs) from the network management component application, either with a corresponding single directed response or a stream of directed PDUs as appropriate.

Each PDU sent from a node to the NMS application should contain an identifier that uniquely places it in the sequence of PDUs sent from that node to the NMS application. The NMS application must not only be able to identify a correctly ordered sequence of PDUs from a single node, but must also be able to distinguish PDUs from different nodes. The NMS application must be able to predict the identifiers of yet-to-be-received PDUs from each node, and must be able to determine how many PDUs are missing between any two that have been received. Though any well-defined system of sequence identifiers may be used, a simple mechanism that meets the requirements is the inclusion of sequence numbers in all PDUs transmitted and received by the NMS application. If the NMS application includes a sequence number in each directed PDU it sends to a node, the node may echo the same sequence number in its corresponding response allowing the detection of unanswered requests. A sequence number may be shared between all of the nodes that an NMS application corresponds with, or separate sequence numbers can be maintained for each node as long as the NMS application employs another mechanism to distinguish the arriving PDUs from different nodes. If the majority of traffic exchanged between an NMS application and node is a stream of PDUs that are autonomously generated by the node, then each such PDU must contain an identifier assigned by the node using an algorithm known by the NMS application.

Every PDU sent from a node to the NMS application should also contain a count of instances since the node was initialized in which attempts to transmit PDUs to the NMS application failed. Such a mechanism will enable the NMS application to determine whether missing PDUs were missed due to problems with the sending node or for other reasons. If the NMS application has deemed the number of available nodes sufficient to execute this algorithm then it will be assumed that the nodes used in the test will not as a rule govern the rate at which they send response PDUs to the NMS application. Therefore, the failure of a PDU to be received by the NMS application may be blamed on the inability of the NMS or the NMS application itself to process inbound and/or outbound PDUs involved in the exchange of traffic between the NMS application and nodes.

In order to gauge its maximum rate of traffic exchange, referred to as the PDU saturation point, the network management application must initiate a test that consists of a simultaneous exchange of PDUs with as many nodes from its list as possible. The purpose of this test is to generate a relatively steady traffic flow between the NMS application and other nodes so that the NMS application's capacity to process traffic is exceeded. The NMS application will view this traffic flow as an aggregated number of inbound and outbound PDUs that eventually reaches the PDU saturation point, which will be computed as an average number of PDUs processed per unit time. If the number of nodes contacted by the NMS application during this test is increased then a smaller amount of traffic must be exchanged with each node to reach the aggregated PDU saturation point, which decreases the likelihood that any particular node will become overloaded. It is important to minimize the possibility of an overloaded node because the NMS application will assume that any PDUs that should have been received from nodes but are instead missing were lost because the NMS application or the NMS fell behind in processing PDUs. If the capacity of a node to respond to the test is reached before the capacity of the NMS application or NMS, one of the following will occur:

The NMS application does not notice that the node is overloaded, and the measurement of its PDU saturation point is unaffected. The node responds to all PDUs that are sent to it by the NMS application, and all PDUs received from the node have sequential identifiers even though the rate of received PDUs levels off. One implication here is that the node is not transmitting PDUs as frequently as possible. Furthermore, if the node is responding to all packets sent to it by the NMS application this implies that there are some packets being generated autonomously by the node that are not occurring with the desired frequency. However, the fact that the measurement of the PDU saturation point is not affected implies that the NMS application is also exchanging information with other nodes and that the aggregate rate of exchange is sufficient to complete the test.

The NMS application notices that the node is overloaded, but the measurement of its PDU saturation point is unaffected. The node either does not respond to all PDUs that are sent to it by the NMS application, and/or some PDUs received from the node have unexpected identifiers that indicate that other PDUs destined for the NMS application have been missed. Since the node reached its capacity to exchange traffic before the NMS application did, this implies that either the node is not successfully receiving all PDUs from the NMS application or the node is actually transmitting PDUs without sequential identifiers. The NMS application will incorrectly attribute the PDUs missing upon reception to its own shortcomings. This problem may be avoided to some extent by ensuring that the node generates PDUs with sequential identifiers unless a specific identifier must be used to indicate the correspondence of a reply with a request PDU from the NMS application. Since the measurement of the PDU saturation point is unaffected, that implies that the NMS application is exchanging a sufficient volume of traffic with other nodes to render the missing PDUs negligible.

The NMS application notices that the node is overloaded and the measurement of its PDU saturation point is affected. The node either does not respond to all PDUs that are sent to it by the NMS application, and/or some PDUs received from the node have unexpected identifiers that indicate that other PDUs destined for the NMS application have been missed. Since the node reached its capacity to exchange traffic before the NMS application did, this implies that either the node is not successfully receiving all PDUs from the NMS application or the node is actually transmitting PDUs without sequential identifiers. The NMS application incorrectly attributes the PDUs missing upon reception to its own shortcomings and interprets the fact that there are missing PDUs as an indication that the PDU saturation point has been reached. This turn of events will result in an artificially low value being measured for the PDU saturation point. This problem may be avoided to some extent by ensuring that the node generates PDUs with sequential identifiers unless a specific identifier must be used to indicate the correspondence of a reply with a request PDU from the NMS application.

Note that the test should be of limited duration and will in all likelihood generate a great deal more traffic on the network than the NMS application would ever experience under normal operating conditions.

The composition of traffic exchanged during the test should reflect as closely as possible the type of traffic that will typically be handled by the NMS application. For example, if the traffic between the NMS application and a node would normally consist of a directed request to the node followed by a corresponding response from the node, then this is the type of traffic that should be generated during the test. If a node would typically send an autonomously generated stream of traffic to the NMS application, then the node should be configured by the NMS application to do so at the start of the test, and the test should then gauge the rate of PDU arrival from the node. To improve the accuracy of the test, the size of the PDUs exchanged during the test should also approximate the size of PDUs that are normally exchanged between the NMS application and other nodes.

The network management application must control the frequency with which PDUs are exchanged during the test with the goal of generating enough traffic to determine the PDU saturation point. For traffic that is to be created with a request-response protocol, wherein the NMS application sends a directed request PDU to the node and the node responds with one or more directed response PDUs, the NMS application should try to send PDUs to as many nodes from its list as possible. The NMS application should send PDUs in a fashion that minimizes the possibility of any node being overwhelmed; a simple way to achieve this is with round-robin ordering in which a PDU is sent to each node in turn, and the list of nodes is cycled through repeatedly. The NMS application should begin sending request PDUs at a moderate rate, then periodically increase the rate of transmission (and consequently the rate of reception for corresponding responses) until a steady pattern is observed in which PDUs either cannot be consistently sent or are being missed upon reception.

Now consider a test that includes traffic streams that are autonomously generated by one or more nodes after their initial configuration by the NMS application. The NMS application should try to achieve the same mix of this traffic with request-response traffic as it expects to see during normal operation. The NMS application should configure as many nodes as possible from its list to generate such traffic streams; as more nodes participate in this exercise each node may generate less traffic, which in turn reduces the possibility of any single node becoming overwhelmed during the test.

Using a predetermined mix of traffic between request-response PDUs and autonomous traffic streams, the NMS application must initiate the test for its PDU saturation point. There must be a maximum number of fixed-length intervals, referred to as test analysis periods, for which the test will execute; for example, five intervals that are each a minute in duration. The duration of a test analysis period is arbitrary, as is the number of periods; the two should be selected so that a satisfactory measurement of the PDU saturation point may be obtained under ideal conditions in less than the maximum number of periods. If an acceptable measurement is acquired before reaching this maximum number of periods the test may terminate, but at most testing will continue until the maximum number of periods is reached. As each new test analysis period is begun, a timer mechanism must be initialized that will eventually be used to determine that the period has ended.

During a test analysis period the NMS application will track the aggregated number of PDUs that it transmits to and receives from all nodes, and therefore must also initialize any counters that are used for this purpose at the beginning of an analysis period. Counts of successful and failed transmissions must be maintained for each test analysis period, as must counts of successful receptions and PDUs that weren't successfully received for reasons other than limitations of the sending nodes (presumably because the NMS or NMS application were unable to process these PDUs though they were available for analysis).

The NMS application must then execute a series of steps for the remainder of the test analysis period. If the mix of traffic to be exchanged with other nodes requires that requests be periodically sent from the NMS application to the nodes, a check must be performed to see whether it is time to transmit such request PDUs to some set or subset of the nodes. If so, an attempt must be made to send the required PDUs to the appropriate nodes. The result of every transmission attempt must be recorded by incrementing a counter; counts of successful or failed PDU transmissions are incremented depending upon the outcome of the attempt. Note that the operating system of the NMS will typically provide an error indication when a PDU cannot be successfully transmitted.

Next, the NMS application must determine whether the current test period has elapsed. If not, the NMS application should begin waiting for a PDU to be received from any of the nodes that it is exchanging traffic with. If no PDUs are received before some maximum amount of time has elapsed, typically one second or less, the NMS application must return to the state in which it checks to see whether request PDUs should be transmitted to some or all nodes. If a PDU is received before the maximum amount of time has elapsed then the NMS application must increment its various counters to reflect reception of the PDU. A count of successfully received PDUs must be incremented to account for the arrival of the PDU itself; every PDU received must be reflected in this counter. Then, by comparing the sequence identifier of the received PDU with the next identifier expected from its originating node, the NMS application may determine whether any PDUs generated by the node before the last one have been missed by the NMS application. If one or more PDUs were missed the NMS application may use a counter that should be included in each received PDU to determine whether the missing PDUs were successfully transmitted by the node, or whether the node itself experienced difficulties in sending them to the NMS application. The number of PDUs that were missed because the node failed to successfully transmit them should be subtracted from the total number of missing PDUs and the difference, representing the PDUs that were missed for other reasons, must be added to a count that is maintained for the duration of the test interval. Note that the very first PDU received by the NMS application from a given node during the initial test analysis period might need to be discarded after information is extracted from it that will be used to track the reception of subsequent PDUs from the node, depending upon implementation. After all appropriate counters have been updated as a result of the received PDU the NMS application should record the following information from the PDU for reference when the next PDU is received from the originating node:

The sequence identifier from the received PDU.

The count from the PDU of the number of times that other PDUs had not been sent to the NMS application because the node experienced difficulties when transmitting them.

The NMS application must then return to the state in which it determines whether request PDUs should be transmitted to some or all nodes.

Note that the method just described maintains a constantly updated count of the number of PDUs that were missed because of reasons other than the originating node having failed to transmit them; this count will be maintained in a constant state of accuracy for the duration of each test period. An alternative implementation that requires less computation for missed PDUs could treat every portion of the PDU reception described above identically except for the way in which missing PDUs are tracked. This alternative method, like the idea proposed above, would require that the sequence identifier of a received PDU be compared with the next identifier expected from its originating node. If one or more PDUs were missed the NMS application would add the total number of missed PDUs to a counter that is maintained for the duration of the test period. Then the counter of missing PDUs that were not successfully sent by the node to the NMS application could be extracted from the received PDU and stored, eliminating the subtraction required each time missing PDUs are detected in the original method. This approach results in three values that must be maintained throughout each test period for each node with which the NMS application exchanges PDUs:

A count of the total number of PDUs missed, as computed from the sequence identifiers of received PDUs.

The counter value from the last PDU received prior to the current test period of PDUs that could not be successfully transmitted by the originating node to the NMS application.

The last counter value from a PDU received during the current test period of the PDUs that could not be sent to this NMS application from the originating node since the node's initialization.

At the end of the test analysis period the counter value from the last PDU received prior to the test period of PDUs that could not be successfully transmitted from the node to the NMS application can be subtracted from the corresponding counter value from the last PDU received during the test period. If counter rollover is accounted for, the result will be the total number of PDUs that should have been sent to the NMS application by the node but couldn't be because of problems experienced within the node. This total may then be subtracted from the total count of PDUs missed during the test period as computed from the sequence identifiers of received PDUs, with the result being the number of PDUs during the test period that were missed because of reasons other than the node's inability to transmit them.

When a test period ends some simple analysis must be performed on the counters accumulated by the NMS application during that interval. The duration of the analysis period must be well defined and known. The number of PDUs that were successfully transmitted by the NMS application to nodes and received by the NMS application from nodes during the analysis period should be available as a result of applying the mechanisms described above. The total number of PDUs that the NMS application exchanged with the other nodes during the analysis period may be obtained by combining the number of PDUs that were successfully transmitted and received by the NMS application. This total may subsequently be divided by the number of seconds in the test analysis period to compute the average number of PDUs per second that were exchanged between the NMS application and nodes during the test analysis period.

Next, the NMS application must determine whether the average PDU exchange rate for the analysis period represents the PDU saturation point of the NMS application. The percentage of PDUs that could not be successfully transmitted from the NMS application to other nodes must be computed, as must the percentage of PDUs that were successfully transmitted by other nodes to the NMS application but were not actually received by the NMS application. The number of PDUs that could not be transmitted by the NMS application can be divided by the sum of the number of PDUs that were successfully transmitted by the NMS application and the number of PDUs that could not be sent by the NMS application to produce the first percentage. The number of PDUs missed on reception by the NMS application due to problems outside the originating nodes may be divided by the sum of the total PDUs received during the analysis period and the number of PDUs missed because of problems outside the sending nodes to produce the second percentage. If either percentage exceeds a certain threshold then a sufficient number of PDUs are being dropped by the NMS or NMS application, either on transmission and/or reception depending upon which threshold(s) were exceeded, to consider the NMS application to have reached its PDU saturation point. Note that the thresholds should be determined individually for each specific NMS application and may be identical for the transmission and reception of PDUs by the NMS application. Typical threshold values will probably range from two to 10 percent.

If the NMS application's PDU saturation point has been reached then the test may be terminated with a successful outcome. If the PDU saturation point has not been attained, a check must be performed to determine whether the maximum number of analysis periods has been executed. If the maximum number of analysis periods has been reached the test must terminate without success. If the limit for test analysis periods has not been reached the results of the freshly concluded period may optionally be stored or saved, the necessary values stored to be carried forward into the next period, and a new analysis period started by returning the NMS application to the state in which it initializes a timer mechanism that will be used to determine when the period has elapsed.

NMS Application Adapter Function and Methods

Figure 3:
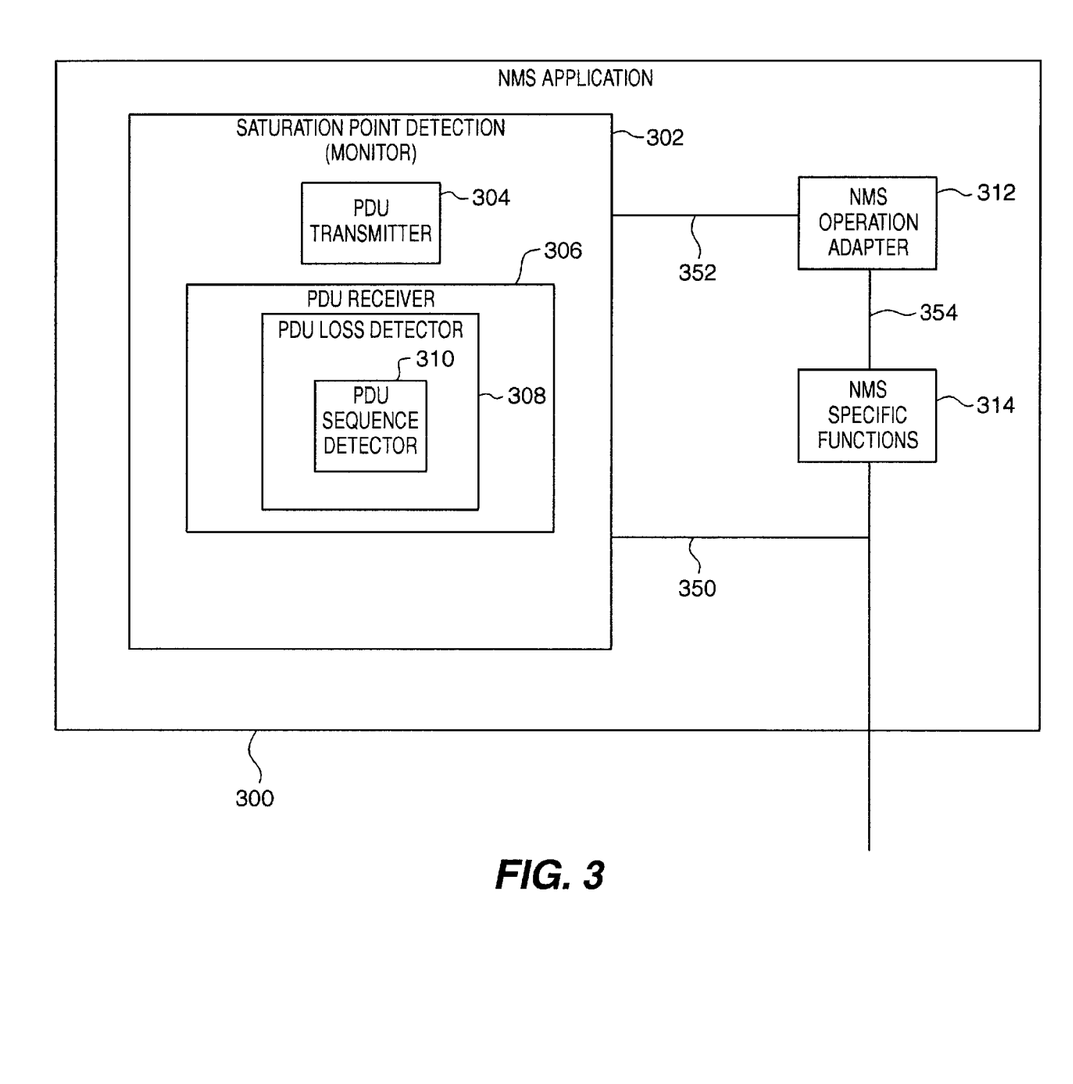
FIG. 3 is a block diagram of the functional components of a preferred embodiment of the present invention.

FIG. 3 is a block diagram describing the functional elements of the NMS application adaptation system. NMS application 300 is operable on a host system to perform a particular, desired network management operation in a network of computing and communication devices. NMS specific functions 314 perform such network management operations on behalf of a management user (not shown) via communication with other nodes (not shown) of the network on network communication path 350.

NMS operation adapter 312 communicates with NMS specific functions 314 via well known inter-process communication path 354 to control operation thereof. With knowledge of the saturation point of the host system on which the application 300 is operating, NMS operation adapter 312 gates operation of NMS specific functions 314 to prevent over subscription of host system resources required for the NMS application 300. In effect, the adapter 312 acts as a governor to prevent the NMS specific functions 314 from overwhelming the resources of the host system on which it is operating.

Adapter 312 determines the saturation point in conjunction with saturation point detection 302 (also referred to herein as a monitor). Monitor 302 includes transmitter 304 to transmit PDUs and receiver 306 to receive returned PDUs. Transmitter 304 transmits a sequence of PDUs wherein each PDU is identified by (at least) a sequence number. Each PDU may additionally include identification information regarding the node to which it was originally directed. The identification information is used by monitor 302 to detect missing returned PDUs (PDU loss) and hence the saturation point of the host system.

Transmitted PDUs are returned from the other nodes to the generating host system and received by receiver 306 of monitor 302. PDU loss detector 308 detects missing or lost PDUs in the sequence of returned PDUs from the other nodes. In particular, PDU sequence detector 310 matches the identification information (including the sequence numbers) against the expected sequence of PDUs to determine which, if any, PDUs were not received as expected in response to transmissions.

Detection of PDU loss in the returned sequence of PDUs is indicative of a PDU exchange rate that over subscribes at least one resource on the host system. Such a condition therefore identifies a saturation point for PDU exchange which may then be used to govern or limit the operation of the NMS application 300. If PDU loss is not presently detected, monitor 302 increases the frequency of transmission by transmitter 304 until PDU loss occurs to thereby identify the saturation point.

Figure 2A:
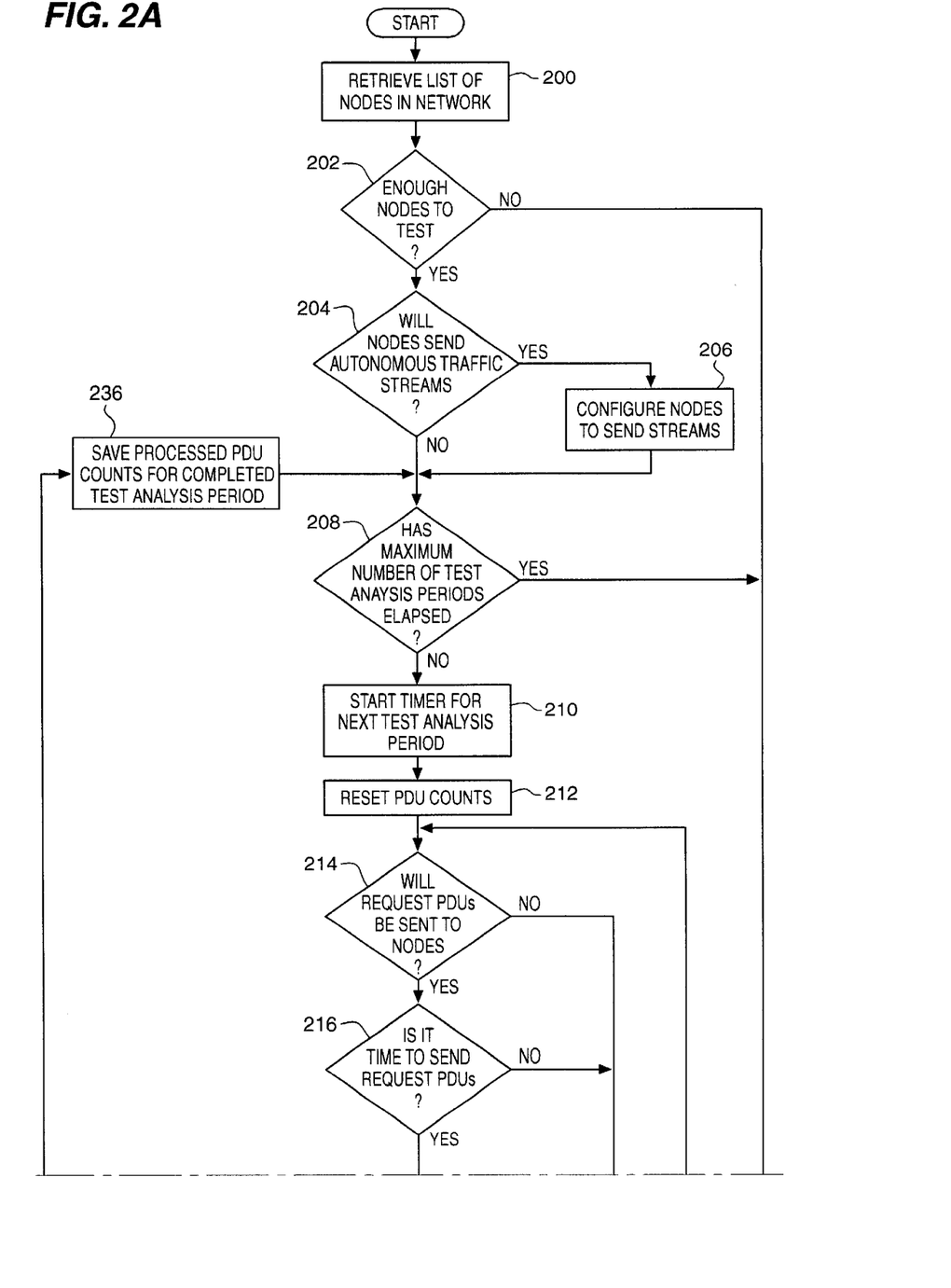
FIGS. 2A and 2B is a flowchart describing the operation of the present invention to dynamically measure the capability of an NMS application host system to permit NMS operations.
Figure 2B:
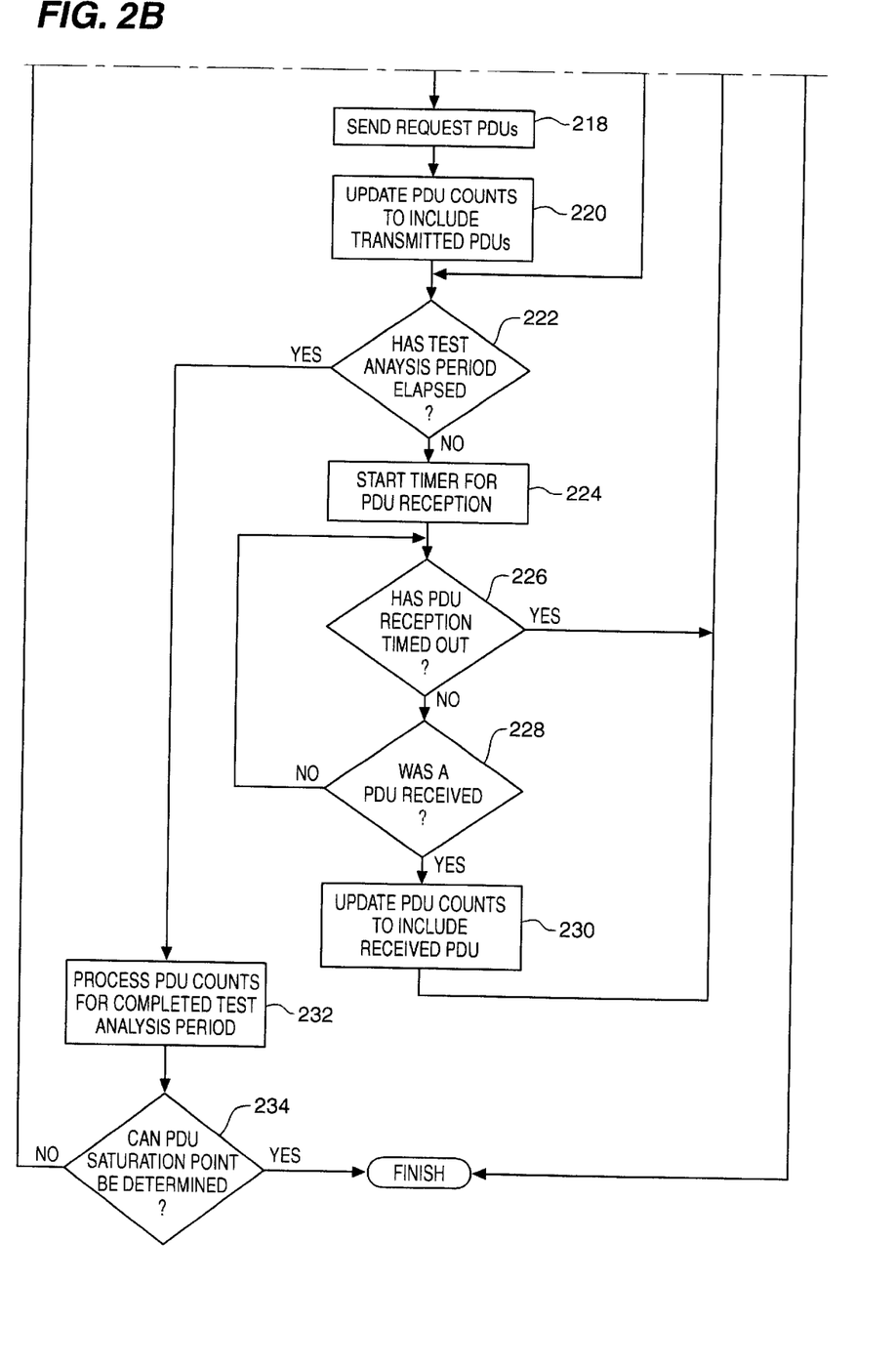

FIGS. 2A and 2B are a flowchart further describing an exemplary preferred embodiment of the dynamic adaptation NMS application of the present invention. Element 200 is first operable to retrieve a list of nodes which participate in the dynamic measurement techniques and resultant adaptation of the NMS operation. If element 202 then determines that insufficient nodes are available for the dynamic measurement tests, processing is completed. Otherwise, element 204 next determines whether the nodes involved in the test are operable to autonomously generate desired PDU exchanges as described herein above. If so, element 206 is operable to so configure the affected nodes to autonomously generate such sequences of PDU for purposes of this periodic test. In either case, element 208 is next operable to determine whether the maximum number of test periods has elapsed without determining the PDU saturation point. If so, the method completes otherwise processing continues with another test sequence iteration.

Elements 210 through 236 are then operable to perform a single iteration of the test sequence to attempt to determine the PDU saturation point. Specifically, element 210 starts a timer to terminate this test iteration after a predetermined test period. Element 212 resets the count of PDUs exchanged in the present test period. As noted above, the number of PDUs exchanged per unit of time is the frequency value to be used in representing the PDU saturation point—the point at which the NMS application must modify or adapt its operation to avoid over subscribing resources of it host system. The counters therefore are updated to account for all PDUs exchanged in the present test period.

Element 214 next tests whether request PDUs will be sent to the node or, as noted above, whether the nodes are operable to autonomously generate desired PDU sequences. If no request PDUs need be sent, processing continues at element 222. Otherwise, element 216 determines if it is an appropriate time in the test period to send more PDUs to the nodes. As noted above, this timeout value is adjusted for each test period in which the PDU saturation point is not detected. Where the saturation is not detected, this timer value is adjusted to more frequently send request PDUs to elicit returned PDUs at a higher frequency—to thus encounter the PDU saturation point for the present host system environment and load. If element 216 determines it is again time to send PDUs, elements 218 and 220 are so operable to send request PDUs to appropriate nodes and to update the counters to reflect such transmission of PDUs.

Element 222 is then operable to determine if the designated test period has yet elapsed. If so, this test period is completed with processing continuing at element 232 as described herein below. Otherwise, element 224 starts another timer to await return of PDUs from nodes in response to the transmitted PDUs (or in response to their configuration to autonomously generate sequences of PDUs). The NMS application waits a predetermined period of time for possible return of a PDU from at least one node. Element 226 then determines whether the receive timer has expired without even a single PDU being received in return. If so, processing continues by looping back to element 214 to continue processing in the present test period. If the PDU receive timer has not expired, element 228 determines whether any return PDU has been received. If not, the wait continue by looping back to element 226 to await reception of at least one return PDU or expiration of the receive timer. If and when at least one return PDU is finally received, element 230 is operable to update the counters to reflect its reception and processing continues by looping back to element 214 to continue processing of the present test period.

Once element 222 determines that the present test period has elapsed, element 232 is operable to process the counts for the just completed test period. This process includes determining the frequency of the transmission of the just completed test period and further includes matching the received return PDUs with expected results elicited by the transmitted PDUs (or by the expected autonomously generated sequences of return PDUs). Element 234 then determines whether the PDU saturation point has been encountered in the just completed test period. If so, the method is complete and the frequency determined by element 232 is then used to adapt the NMS application operation to the presently measured PDU saturation point. If the saturation point has not been encountered, element 236 is operable to save the results of the just completed test period and to then initiate a new test period with an adjusted frequency in another attempt to determine the PDU saturation point. Processing therefore continues with element 208 to begin a new test period if allowed.

Those skilled in the art will recognize a wide variety of equivalent implementations of this method in accordance with well known software design principles and design choices. The flowchart of FIGS. 2A and 2B is therefore intended as exemplary of and representative of all such techniques which dynamically measure the availability of resources on the host system of an NMS application.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for adapting operation of a network management system application to a host system capacity on which said network management system application operates comprising the steps of:

determining a protocol data unit exchange saturation point of said host system wherein said saturation point is determined by operation of said network management system application operating within said host system; and adapting operation of said network management system application so as to not exchange protocol data units with other nodes of a network in excess of said saturation point.

2. The method of claim 1 wherein the step of determining said saturation point includes the steps of:

sending a sequence of transmit protocol data units to each of said other nodes;

receiving a sequence of returned protocol data units from said other nodes in response to sending of said sequence of transmit data protocol units wherein each returned protocol data unit corresponds to a transmit protocol data unit of said sequence of transmit protocol data units; and detecting that at least one protocol data unit of said sequence of transmit protocol data units was not received by said host system to thereby detect said saturation point.

3. The method of claim 2 wherein each transmit protocol data unit in said sequence includes a transmit sequence number indicative of the sequential position of said each transmit protocol data unit in said sequence of transmit protocol data units relative to others of said sequence of transmit protocol data units.

4. The method of claim 3 wherein said each transmit protocol data unit of said sequence of transmit protocol data units further includes a node ID indicative of the node to which said each transmit protocol data unit was transmitted and from which it is expected to be returned.

5. The method of claim 4 wherein the step of detecting includes the step of detecting from said transmit sequence number and from said node ID that at least one protocol data unit of said sequence of transmit protocol data units was not received by said host system to thereby detect said saturation point.

6. The method of claim 3 wherein the step of detecting includes the step of detecting from said transmit sequence number that at least one protocol data unit of said sequence of transmit protocol data units was not received by said host system to thereby detect said saturation point.

7. The method of claim 1 wherein the step of determining said saturation point includes the steps of:

periodically exchanging protocol data units with all of said other nodes wherein the exchange with said other nodes is substantially simultaneous;

detecting loss of protocol data units returned to said host system from at least one node of said other nodes; and determining said saturation point from the frequency of the periodic exchange.

8. The method of claim 7 wherein the step of determining said saturation point further includes the step of:

increasing the frequency of the periodic exchange until said loss of protocol data units is detected.

9. An adaptable network management system application operable on a host system of a network, said system comprising:

a protocol data unit exchange monitor that detects a saturation point in protocol data unit exchange between said network management system application and other nodes of said network wherein said saturation point is determined by said monitor by operation of said network management system application operating within said host system; and an operation adapter that adapts said network management system application so as to not exchange protocol data units with other nodes of said network in excess of said saturation point.

10. The system of claim 9 wherein said monitor includes:

a protocol data unit transmitter to transmit a sequence of transmit protocol data units to each of said other nodes;

a protocol data unit receiver to receive a sequence of returned protocol data units from said other nodes in response to sending of said sequence of transmit data protocol units wherein each returned protocol data unit corresponds to a transmit protocol data unit of said sequence of transmit protocol data units; and a protocol data unit loss detector to detect that at least one protocol data unit in said sequence of transmit protocol data units was not received by said host system from at least one node of said other nodes whereby said protocol data unit loss detector determines said saturation point.

11. The system of claim 10 wherein each transmit protocol data unit in said sequence includes a transmit sequence number indicative of the sequential position of said each transmit protocol data unit in said sequence of transmit protocol data units relative to others of said sequence of transmit protocol data units.

12. The system of claim 11 wherein said each transmit protocol data unit of said sequence of transmit protocol data units further includes a node ID indicative of the node to which said each transmit protocol data unit was transmitted and from which it is expected to be returned.

13. The method of claim 12 wherein said protocol data unit loss detector includes:

a sequence detector to detect from said transmit sequence number and from said node ID that at least one protocol data unit of said sequence of transmit protocol data units was not received by said host system to thereby detect said saturation point.

14. The system of claim 11 wherein said protocol data unit loss detector includes:

a sequence detector that detects from said transmit sequence number that at least one protocol data unit of said sequence of transmit protocol data units was not received by said host system to thereby detect said saturation point.

15. The system of claim 9 wherein said monitor includes:

a period protocol data units transceiver to exchange protocol data units with all of said other nodes wherein the exchange with said other nodes is substantially simultaneous;

a protocol data unit loss detector to detect loss of protocol data units returned to said host system from at least one node of said other nodes wherein said protocol data unit loss detector determines said saturation point from the frequency of the periodic exchange.

16. The system of claim 15 wherein said monitor increases the frequency of the periodic exchange until loss of protocol data units is detected.

17. A computer readable storage medium tangibly embodying programmed instructions for implementing a method for adapting operation of a network management system application to a host system capacity on which said network management system application operates, said method comprising the steps of:

determining a protocol data unit exchange saturation point of said host system wherein said saturation point is determined by operation of said network management system application operating within said host system; and adapting operation of said network management system application so as to not exchange protocol data units with other nodes of a network in excess of said saturation point.

18. The storage medium of claim 17 wherein the method step of determining said saturation point includes the steps of:

sending a sequence of transmit protocol data units to each of said other nodes;

receiving a sequence of returned protocol data units from said other nodes in response to sending of said sequence of transmit data protocol units wherein each returned protocol data unit corresponds to a transmit protocol data unit of said sequence of transmit protocol data units; and detecting that at least one protocol data unit of said sequence of transmit protocol data units was not received by said host system to thereby detect said saturation point.

19. The storage medium of claim 18 wherein each transmit protocol data unit in said sequence includes a transmit sequence number indicative of the sequential position of said each transmit protocol data unit in said sequence of transmit protocol data units relative to others of said sequence of transmit protocol data units.

20. The storage medium of claim 19 wherein said each transmit protocol data unit of said sequence of transmit protocol data units further includes a node ID indicative of the node to which said each transmit protocol data unit was transmitted and from which it is expected to be returned.

21. The storage medium of claim 20 wherein the method step of detecting includes the step of detecting from said transmit sequence number and from said node ID that at least one protocol data unit of said sequence of transmit protocol data units was not received by said host system to thereby detect said saturation point.

22. The storage medium of claim 19 wherein the method step of detecting includes the step of detecting from said transmit sequence number that at least one protocol data unit of said sequence of transmit protocol data units was not received by said host system to thereby detect said saturation point.

23. The storage medium of claim 17 wherein the method step of determining said saturation point includes the steps of:

periodically exchanging protocol data units with all of said other nodes wherein the exchange with said other nodes is substantially simultaneous;

detecting loss of protocol data units received by said host system from at least one node of said other nodes; and determining said saturation point from the frequency of the periodic exchange.

24. The storage medium of claim 23 wherein the method step of determining said saturation point further includes the step of:

increasing the frequency of the periodic exchange until said loss of protocol data units is detected.

* * * * *